United States Patent
Chu et al.

(10) Patent No.: US 9,396,258 B2
(45) Date of Patent: Jul. 19, 2016

(54) RECOMMENDING VIDEO PROGRAMS

(75) Inventors: Michael Chu, Los Altos Hills, CA (US); Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 616 days.

(21) Appl. No.: 12/358,120

(22) Filed: Jan. 22, 2009

(65) Prior Publication Data

US 2010/0186041 A1   Jul. 22, 2010

(51) Int. Cl.
| | |
|---|---|
| *H04N 7/10* | (2006.01) |
| *H04N 7/025* | (2006.01) |
| *G06F 3/00* | (2006.01) |
| *G06F 13/00* | (2006.01) |
| *H04N 5/445* | (2011.01) |
| *G06F 17/30* | (2006.01) |
| *H04N 21/442* | (2011.01) |
| *H04N 21/45* | (2011.01) |
| *H04N 7/16* | (2011.01) |
| *H04N 21/482* | (2011.01) |
| *H04N 7/173* | (2011.01) |
| *H04N 21/258* | (2011.01) |
| *H04N 21/81* | (2011.01) |

(52) U.S. Cl.
CPC .... *G06F 17/30781* (2013.01); *G06F 17/30867* (2013.01); *H04N 5/44543* (2013.01); *H04N 7/163* (2013.01); *H04N 7/17318* (2013.01); *H04N 21/25891* (2013.01); *H04N 21/44222* (2013.01); *H04N 21/4532* (2013.01); *H04N 21/482* (2013.01); *H04N 21/812* (2013.01)

(58) Field of Classification Search
CPC .................. G06F 17/30781; G06F 17/30867; H04N 5/44543; H04N 7/163; H04N 7/17318; H04N 21/25891; H04N 21/44222; H04N 21/4532; H04N 21/482; H04N 21/812

USPC .................................................... 725/46, 34
See application file for complete search history.

(56) References Cited

U.S. PATENT DOCUMENTS

| | | | | |
|---|---|---|---|---|
| 6,005,565 | A * | 12/1999 | Legall et al. ................... | 715/721 |
| 6,029,195 | A * | 2/2000 | Herz ............................. | 725/116 |
| 6,266,649 | B1 * | 7/2001 | Linden et al. ................ | 705/7.29 |
| 6,317,722 | B1 | 11/2001 | Jacobi et al. | |
| 7,007,294 | B1 * | 2/2006 | Kurapati ......................... | 725/53 |
| 7,050,992 | B1 * | 5/2006 | Bowman et al. ............. | 705/26.3 |
| 7,113,917 | B2 | 9/2006 | Jacobi et al. | |
| 7,152,209 | B2 * | 12/2006 | Jojic et al. ...................... | 715/720 |
| 7,562,068 | B2 * | 7/2009 | Naam ............... G06F 17/30867 | |
| 7,581,237 | B1 * | 8/2009 | Kurapati ......................... | 725/46 |
| 7,624,416 | B1 * | 11/2009 | Vandermolen et al. ....... | 725/109 |
| 8,442,973 | B2 * | 5/2013 | Cramer ............. G06F 17/30867 | 707/723 |
| 8,560,950 | B2 * | 10/2013 | Bull et al. ...................... | 715/716 |
| 8,626,772 | B2 * | 1/2014 | Lidstrom .......... G06F 17/30867 | 707/748 |

(Continued)

OTHER PUBLICATIONS

PCT International Search Report and Written Opinion, PCT/US2010/021635, Mar. 18, 2010, 9 Pages.

(Continued)

*Primary Examiner* — Jonathan V Lewis
(74) *Attorney, Agent, or Firm* — Byrne Poh LLP

(57) ABSTRACT

A system and method for recommending video programs to a user comprising determining a first video program that is of interest to a user and then determining a second video program to recommend to the user, the second video program being determined from a recommendation database assembled by analyzing access logs from one or more search engines or online video content providers.

27 Claims, 4 Drawing Sheets

(56) References Cited

U.S. PATENT DOCUMENTS

| | | | | |
|---|---|---|---|---|
| 8,789,104 | B2* | 7/2014 | Thurston | H04N 7/163 725/39 |
| 9,275,171 | B2* | 3/2016 | Gross | G06F 17/3097 |
| 2002/0042923 | A1* | 4/2002 | Asmussen et al. | 725/92 |
| 2003/0221198 | A1* | 11/2003 | Sloo | 725/136 |
| 2004/0088730 | A1* | 5/2004 | Gopalan | H04N 7/16 725/93 |
| 2005/0028207 | A1* | 2/2005 | Finseth et al. | 725/46 |
| 2007/0039023 | A1* | 2/2007 | Kataoka | 725/46 |
| 2007/0061724 | A1* | 3/2007 | Slothouber et al. | 715/716 |
| 2007/0157242 | A1* | 7/2007 | Cordray et al. | 725/46 |
| 2007/0250863 | A1* | 10/2007 | Ferguson | 725/46 |
| 2007/0266021 | A1* | 11/2007 | Aravamudan et al. | 707/5 |
| 2008/0005108 | A1* | 1/2008 | Ozzie | G06F 17/30867 |
| 2008/0295132 | A1* | 11/2008 | Icho et al. | 725/46 |
| 2008/0301737 | A1* | 12/2008 | Hjelmeland Almas et al. | 725/61 |
| 2009/0044227 | A1* | 2/2009 | Nagatani et al. | 725/46 |
| 2009/0083796 | A1* | 3/2009 | Karasudani et al. | 725/39 |
| 2009/0100455 | A1* | 4/2009 | Frikker et al. | 725/13 |
| 2009/0228918 | A1* | 9/2009 | Rolff et al. | 725/34 |
| 2009/0235298 | A1* | 9/2009 | Carlberg et al. | 725/24 |
| 2009/0249400 | A1* | 10/2009 | Carlberg et al. | 725/44 |
| 2011/0258049 | A1* | 10/2011 | Ramer | G06F 17/30867 705/14.66 |

OTHER PUBLICATIONS

European Telecommunications Standards Institute, "TV Anytime Standard", Technical Report, ETSI TS 102 822, Nov. 2007.

International Preliminary Report on Patentability dated Jul. 26, 2011 in International Patent Application No. PCT/US2010/021635.

\* cited by examiner

RECOMMENDING VIDEO PROGRAMS

BACKGROUND OF THE INVENTION

1. Field of the Invention

The present invention is related to a system for recommending video programs to a user.

2. Description of the Background Art

A current approach to recommending a video program to a user requires that the user have a digital video recorder and a subscription service. In such an approach, the subscription service monitors the television programming the user watches as well as what the user records. This information is combined with information identifying what other users watch and the subscription service then displays or records additional programming to the user's digital video recorder that the service determines might be of interest to the user. The pool of information from which to make recommendations is however limited to the number of users of that particular television broadcast system.

In another current approach, the user trains the subscription service by rating the television programming the user watches or records. This rating information is factored into the determination of which programs the subscription service recommends to the user. This however requires waiting the time it takes the system to be trained to get recommendations that are of any value.

Additionally, the recommendations made by the subscription service are based only on what other users with similar viewing habits watch and the subscription service only has information about what a user watches through the television broadcast system. The subscription service cannot take into account video programming the user watches through other means such as playing a DVD or downloading from the internet. The subscription service also does not have any way of obtaining information that a user searched online for information about a new series that has not aired yet.

SUMMARY OF THE INVENTION

A recommendation system uses data about video programs of interest to a user and data from interactions with web services systems such as search engines and online video content providers to determine associated programs that may be of interest to a user. Because of the vast number of users of search engines and online video content providers, associations between video programs can be identified that cannot be detected in other ways. These associations can then be used to provide recommendations to users of video programs.

To construct a database of recommendations, the recommendation system accesses access logs of one or more web services systems such as internet search engines or access logs of one or more online video content providers. From the access logs information is obtained about interactions with the search engine or online video content provider that relates to video programs or information related to video programs. An interaction is an exchange between the user and the system. Interactions include a search query and downloading video content. The interactions can then be aggregated to identify which combinations of interactions relating to video programs or combinations of interactions relating to a video program and an attribute of a video program occur during the same session. The co-occurrence of such interactions is used to determine that one video program would be of interest to a user given another video program assumed to be of interest to the user. Data about the programs of interest to the user may be obtained any number of ways including being sent to the recommendation system by a client or retrieved from a user profile stored as part of the recommendation system. Programs of interest include programs the user watches via a TV broadcast system as well as any programs watched from other sources, including any source of pre-recorded media (e.g., video stored on optical disc), or programs that have been downloaded from online video content providers.

In order to make a recommendation of a video program, the recommendation system receives an identifier of a video program of interest to the user. The recommendation system queries a database of recommendations to determine a second video program that is related to the video program of interest to the user. The recommendation system also determines when the returned related video programs will be available to view at the user's location. For returned related video programs that are available for viewing within a predetermined amount of time into the future, the recommendation sends a package to the user that comprises the identity of the recommended video program as well as the information of when that video program can be viewed and on which channel.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

System Architecture Overview

Figure 1:
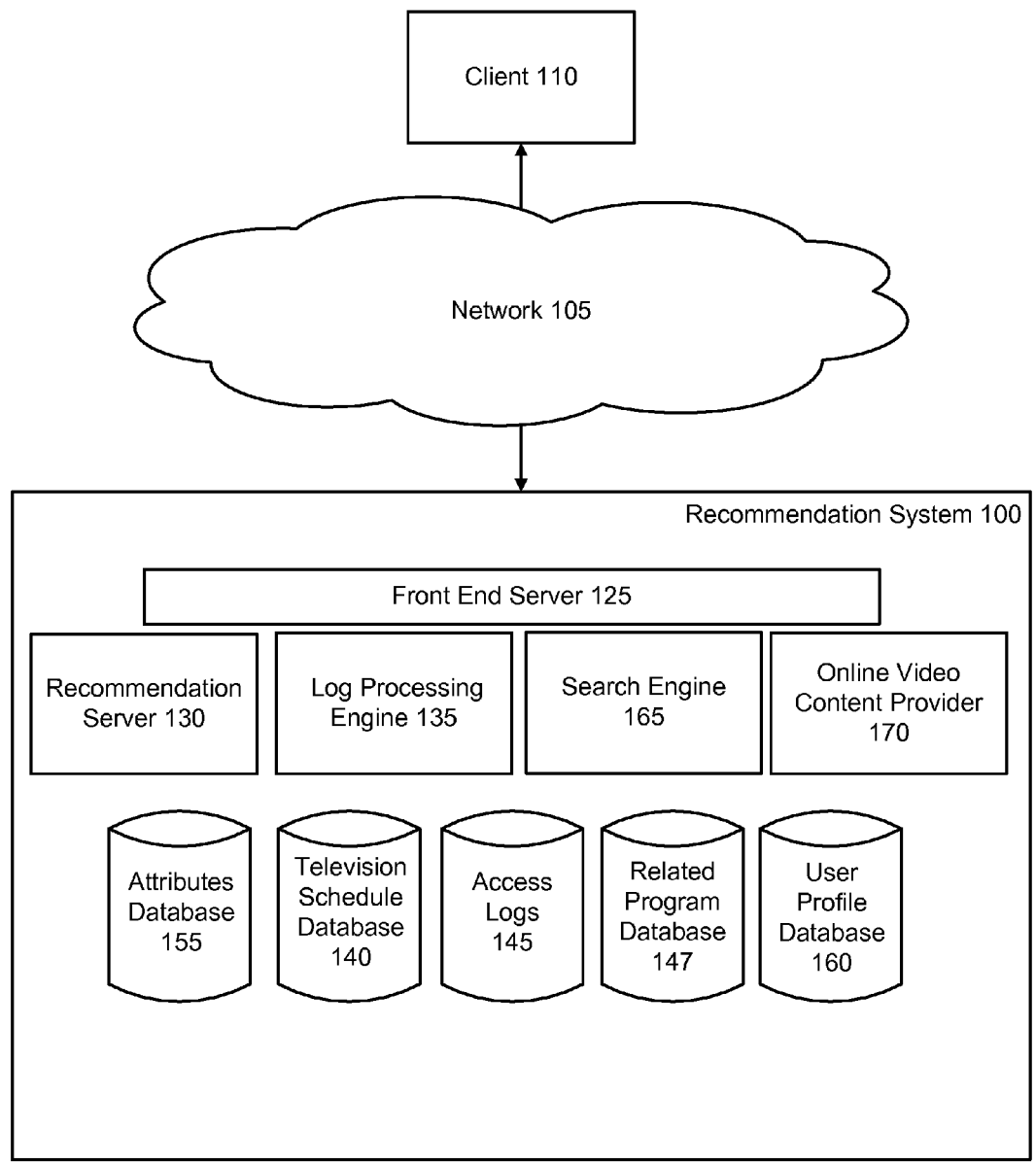
FIG. 1 is a diagram of system architecture according to one embodiment.

FIG. 1 is a diagram of system architecture according to one embodiment. The recommendation system 100 includes a front end server 125, a recommendation server 130, a log processing engine 135, a search engine 165, an online video content provider 170, an attributes database 155, a television schedule database 140, access logs 145, related video program database 147, and a user profile database 160. For simplicity, only one recommendation server 130, one log processing engine 135, one search engine 165 and one online video content provider 170 are shown but in practice, many recommendation servers 130, log processing engines 135, and search engines 165 will be in operation.

The recommendation system 100 communicates with a client 110 via the network 105, which is typically the Internet, but may also be any network, including but not limited to a LAN, a MAN, a WAN, a mobile, wired or wireless network, a private network, or a virtual private network, and any combination thereof. The client 110 is any type of device that is adapted to access the recommendation system 100 over the network 105. Examples of clients include but are not limited to personal computing devices, mobile phones, remote controls, and devices that receive video programs such as cable or satellite set top boxes, which have been adapted to provide the structures and functions described herein. Most basically, a client 110 is configured to transmit identifiers of video programs to the recommendation system 100 and receive information identifying and/or describing recommended video programs from the recommendation system 100. Optionally, a client 110 may be configured to control a television or other audio/video output device on which the user can watch video programs, including recommended programs. For simplicity only one client 110 is shown. In practice there will be numerous clients 110 communicating with the recommendation system 100.

The recommendation server 130 is implemented as server program executing on one or more server-class computers comprising a CPU, memory, network interface, peripheral interfaces, and other well known components. The computers themselves preferably run an open-source operating system such as LINUX, have generally high performance CPUs, with 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media), or by equivalent implementations in hardware and/or firmware. Alternatively, the recommendation server 130 can be implemented in dedicated hardware, using custom designed circuitry to implement the logic of the operations described herein.

The attributes database 155 stores the title and other attributes of video programs. From the attributes database 155, attributes of a given video program can be determined, and conversely video programs with given attributes can also be identified. The attributes database may be a source external to the recommendation system 100, such as the Internet Movie Database at "www.imdb.com," or the like. Attributes of a video program are any metadata used to describe the video program, and include the data such as various people associated with the program (e.g. actors, actresses, presenters, producers, directors, musicians, etc.), plot summary and keywords, locations (e.g., where the program takes place), genre (e.g. sporting event, drama, comedy, reality, game show, soap opera, and documentary), date information (production, air date, etc.), ratings (e.g. TV-14, G, NR), and quality ratings (e.g. "4 stars"), reviews, production information, and so forth. One example of a standardized system of organizing attributes for broadcast programming is the "TV Anytime" Standard, European Telecommunications Standards Institute, ETSI TS 102 822.

The television schedule database 140 stores the television program schedule on television broadcast systems in different geographic areas. Television broadcast systems include those that broadcast over-the-air signals, cable, and satellite services, including both analog and digital broadcast systems. Television schedule information is widely available from commercial sources.

The access logs 145 contain information about user interactions with the search engine 165 or online video content provider 170 (generally a "web service"). Search engines 165 include for example Google™, and the like; online video content providers 170 include video hosting websites such as YouTube™, and video rental/download websites such as Netflix™. Each log entry includes an IP address of the client device interacting with the web service, timestamp information, the user's ID if the web service offers accounts for users, the type of interaction and other metadata. The type of interaction is what the user did at the web service. In the case of search engines, the most common interaction is a search query and the terms searched would be included in the metadata of the interaction stored in the access logs 145. Online video content providers generally include search interfaces that allow users to search for video content within the provider's system. A search query is therefore also a type of interaction with an online video content provider. Additional types of interactions with online video content providers include playing streaming video programs, downloading video programs, and requesting video programs to be delivered to the user on physical media. Renting a video program on a DVD via an online content provider is one embodiment of requesting a video program for delivery to the user on physical media. The identity of the video program being streamed or downloaded is among the metadata stored for streaming or downloading video programs or requesting video programs for delivery on physical media.

The related video program database 147 stores video program information including information that identifies video programs that are determined to be related to each other by the operation of the log processing engine 135. The operation of the log processing engine 135 is discussed in greater detail in reference to FIG. 2.

The user profile database 160 stores user profiles which are used by the recommendation system 100. Each user profile includes information associated with the user, along with names of video programs that have been received from the client 110 as part of search queries, as well as names of video programs that have previously been recommended to the user. Additionally, the user profile may include attributes of video programs that are of interest to the user and that the user has entered into the profile. The user may, but need not, provide information such as favorite movies, actors, genres, and so forth. The user accesses the user's profile via the client 110. Users are identified by a user identifier. The user identifier identifies the user's location and is matched to the user's television broadcast system so that the correct channel and time may be found for the recommended video programs in the television schedule database 140. An IP address or zip code may be used to identify the user's location.

For additional personalization of recommendations, the user profile can include information from the user's other profiles at third party services, e.g. such as other search engines, content providers or the like. Information from the user's profile for such other services includes on which video programs and attributes of video programs the user has searched. Additionally the information from the user's profile includes which video programs the user has downloaded, streamed or requested for delivery on physical media.

The attributes database 155, television schedule database 140, access logs 145, related video program database 147 and user profile database 160, may be stored using any type of data storage system, operating on server class computer systems.

Generation of Related Video Program Database

The log processing engine 135 processes access logs 145 of one or more internet search engines and online video content providers to populate the related video program database 147 with information about video programs that are related to each other, and could be recommended to a user. Of interest here are searches by users for the names of video programs, or attributes of video programs and names and attributes of video programs streamed or downloaded by the user or provided to the user on a physical medium.

The fact that multiple interactions are being performed by the same user can be determined from the metadata stored with the searches in the access logs 145. A single session may be determined by a user logging into and out of a search engine 165 or online video content provider 170. For example to search Netflix™, a user logs into the user's account, and either manually logs out, or is deemed to have logged out after some period of non-activity. Alternatively, sessions are determined heuristically, based on the IP addresses and timestamps associated with each search request. By way of example, a session can be fixed in length (e.g., all interactions from an IP address within a 15 minute interval from a first interactions), or variable (all interactions from an IP address, so long as each interaction is within X minutes (e.g., 3 minutes) of the previous interaction). The log processing engine 135 is programmed to assign identify interactions performed by a single user, and then assign the various interactions into one or more sessions.

Figure 2:
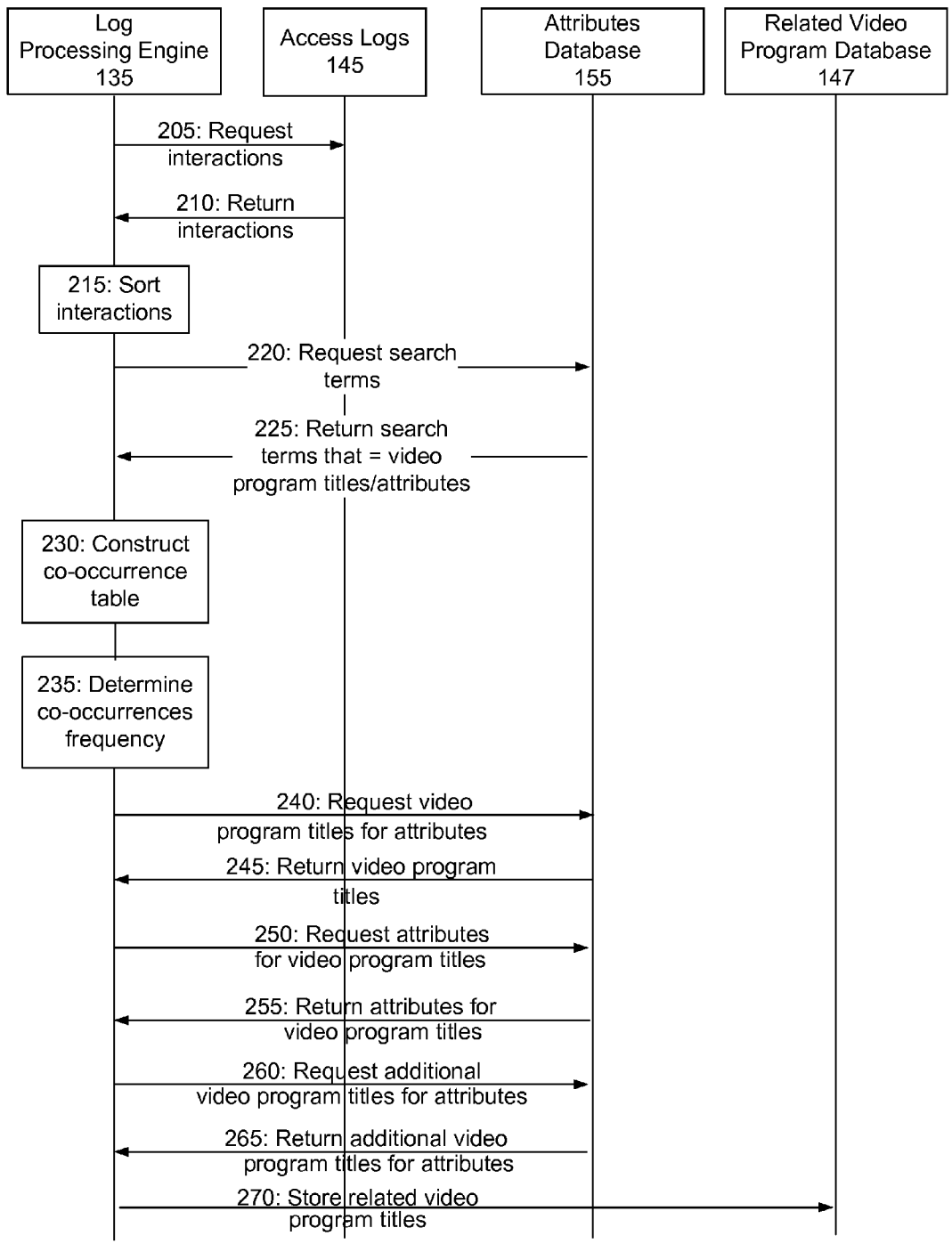
FIG. 2 is a data flow chart showing the method of populating the related video program database according to one embodiment.

Referring to FIG. 2, the log processing engine 135 requests 205 interactions and their associated metadata from the access logs 145. The access logs 145 return 210 interactions and the metadata. The log processing engine 135 organizes 215 the interactions to group together the interactions into sessions, using the various approaches discussed above. To determine which interactions are related to video programs, the metadata associated with interactions are applied to a database of attributes of video programs. For interactions which are search queries, the log processing engine 135 determines which of the search queries refer to titles of video programs or attributes of video programs by querying 220 the search terms in each search in the attributes database 155. This identifies the matching terms as related to video programs, and the remaining terms as unrelated for this purpose. In addition, each returned query would be identified by its type, such as title, producer, location, and so forth. For interactions which are downloading or streaming of video programs or requesting videos for delivery to the user on a physical medium, the titles of video programs are determined from the associated metadata. Attributes of the video program streamed or downloaded may also be identifiable from metadata associated with the interaction.

The log processing engine 135 constructs 230 a co-occurrence table of the titles of video programs, and preferably, though optionally, as well between program titles and program attributes, and between one or more of the program attributes other than titles. If the co-occurring searches during a given search session relate to video programs A, B, C, and D, then the pairs are AB, AC, AD, BC, BD and CD. The frequency count for each co-occurring pair of video program related searches is then updated; the update can be a unitary increment, or some partial weighted value, based on the information such as TF-IDF for the search terms, or other factors. This process is repeated across of the search sessions identified in the access logs 145.

The identified co-occurrences are then used to determine relative recommendation strengths for the video programs identified in the co-occurrence table with a given first video program. The more similarities there are between a video program and the first video program, the higher the recommendation strength for that video program. For example, to determine relative recommendation strengths for movies N and P which co-occur with movie M in the co-occurrence table, assume the following information is determined:

Movie M been downloaded 50 times with movie N,
Movie M been downloaded 10 times with movie P,
Movie M been searched 11 times with movie Q,
Movie M been searched 19 times with movie N,
Movie M been rented by 80 times with movie N, and
Movie M been recorded to a DVR system 15 times with movie P.

Once the session information has been processed, the engine determines which of the co-occurring video programs (and/or attributes) are determined to be related, based on the statistical significance of the co-occurrence frequency information. Significance can be determined based various tests such as correlation, information gain, or the like.

Any method known in the art to measure relationships between random variables may be used by the log processing engine 135. Examples include correlation and information gain analyses.

The recommendation strength for a given video is a function of a weighted combination of the co-occurrence information. The different types of interactions can carry different weights. Two video programs being downloaded together is more indicative that one person may enjoy both programs than merely searching on both movies, and thus co-occurring downloads are given a higher weight than co-occurring searches. In addition, the co-occurrence frequencies can be normalized with respect to total population metrics, or expressed in relative terms or percentages, such as 65% of the time that Movie M is downloaded, Movie N is downloaded with it.

Additionally or alternatively, the attributes of co-occurring video programs are analyzed to determine whether the video programs have any attributes in common. The attributes of the video programs which co-occur would be determined by querying the attributes database 155. The more attributes the two video programs have in common, the higher this contribution to the recommendation strength would be.

For interactions that are search queries on video program attributes, the log processing engine 135 requests 240 video programs that have those attributes in the attributes database 155. For attributes that are persons (e.g., actor, producer, director), the engine returns 245 a list of video programs in which that person is listed.

For attributes that are descriptive of a video program (e.g., genre, location, year), the attributes database 155 returns 245 programs that have matching attributes.

The attributes database 155 can return a limited number of video programs that match the attribute, or can return all matching programs. In either case, the attributes database 155 ranks the returned video programs. The ranking can be determined by any known ranking or sorting method such as alphabetical, age of video program, frequency information of the video programs terms, their popularity (e.g., number of searches for same), user rating, or extrinsic information (e.g., Neilsen rating share), etc.

For interactions that are the titles of video programs, the log processing engine 135 looks up the corresponding attributes in the attributes database 155, including the associated people (e.g., actors, director, writer, producer), genre, year, locale, ratings, and so forth. Then, for each of the returned attributes the log processing engine 135 uses each of these as a secondary query, and looks up 260 additional (secondary) video programs that have these attributes. These secondary related programs are then processed as co-occurring programs with the video programs that were identified from the original queries, and co-occurrence frequency information is updated accordingly. Since the secondary related programs have a more remote connection to the original video programs from the search query the update value can be down weighted. Thus, the log processing engine 135 associates not only the original video programs that were search queries with significant co-occurrence, but also other video programs with the same attributes.

The above process of constructing the co-occurrence information is repeated periodically, for example on a weekly basis, or as new video programs are added to the video program database.

Example of Determining Related Video Programs from Access Logs

Using the process as outlined above and referring again to FIG. 2, the log processing engine 135 retrieves interactions from access logs 145 and after sorting 215 the interactions, determines that the following interactions took place within the same session by an individual user: downloaded "Diamonds are Forever," and searched on "heart attack," "diabetes," "turkey gravy," "Antarctica" and "Meryl Streep." In order to determine which of these interactions involve titles of video programs or attributes of video programs, or are interactions unrelated to video programs, the log processing engine 135 looks up 220 the search terms from the search queries and title of the downloaded material in the attributes database 155. The attributes database 155 returns "Diamonds are Forever" as a title of a video program and "Antarctica" and "Meryl Streep" as attributes of video programs. Using a co-occurrence table, the log processing engine 135 determines 235 co-occurrence frequency. Assuming the co-occurrences of "Diamonds are Forever" and "Antarctica" as well as "Diamonds are Forever" and "Meryl Streep" are statistically significant, those two pairs of interactions are determined to be related.

In order to determine related video programs to enter in to the related video program database 147, the log processing engine 135 requests 240 video program titles for the search queries that are video program attributes in the attributes database 155. For the video program attributes, "Meryl Streep" and "Antarctica," the log processing engine requests 240 video programs that have those attributes in the attributes database 155. For "Meryl Streep," the attributes database returns 245 video programs in which Meryl Streep is listed as an actor, such as "The Hours," in addition to television shows on which Meryl Streep has been interviewed such as the Aug. 17, 2000 episode of Charlie Rose. For "Antarctica," the attributes database 155 returns 245 video programs that are set in Antarctica such as the television show "The Last Place on Earth" and the documentary "March of the Penguins." The returned video programs are stored 270 in the related video program database 147 as related to "Diamonds are Forever."

Attributes of "Diamonds are Forever" are requested 250 by the log processing engine 135. The attributes returned 255 by the attributes database 155 include "Sean Connery," an actor in "Diamonds are Forever" and "Amsterdam," a location where part of "Diamonds are Forever" takes place. Using "Sean Connery" and "Amsterdam" as secondary queries, the log processing engine 135 looks up 260 additional video program titles for which "Sean Connery" and "Amsterdam" are attributes. The titles returned 265 by the attributes database 155 for "Sean Connery" include for example, "Robin and Marian" and "A Bridge Too Far." The titles returned 265 for "Amsterdam" include the documentary, "Amsterdam Nights" and the second episode of the fifth season of "Alias," which takes place, in part, in Amsterdam. These secondary programs are also stored 270 as related to the "Meryl Streep" and "Antarctica" programs in the related video program database 147.

Based on the example search session, other programs that would be stored as related to "Diamonds are Forever" would include a James Bond movie that takes place in Antarctica if such one existed and television programs starring actors that appear both in "Diamonds are Forever" and in Meryl Streep movies.

Optionally, in addition to storing programs as related, the type of interaction from the access logs 145 that co-occurred and led to the determination that a given video program is related to another video program are also stored in the related video program database 147. This information is useful for personalization of recommendations.

Overview for Recommending Video Programs

Figure 3:
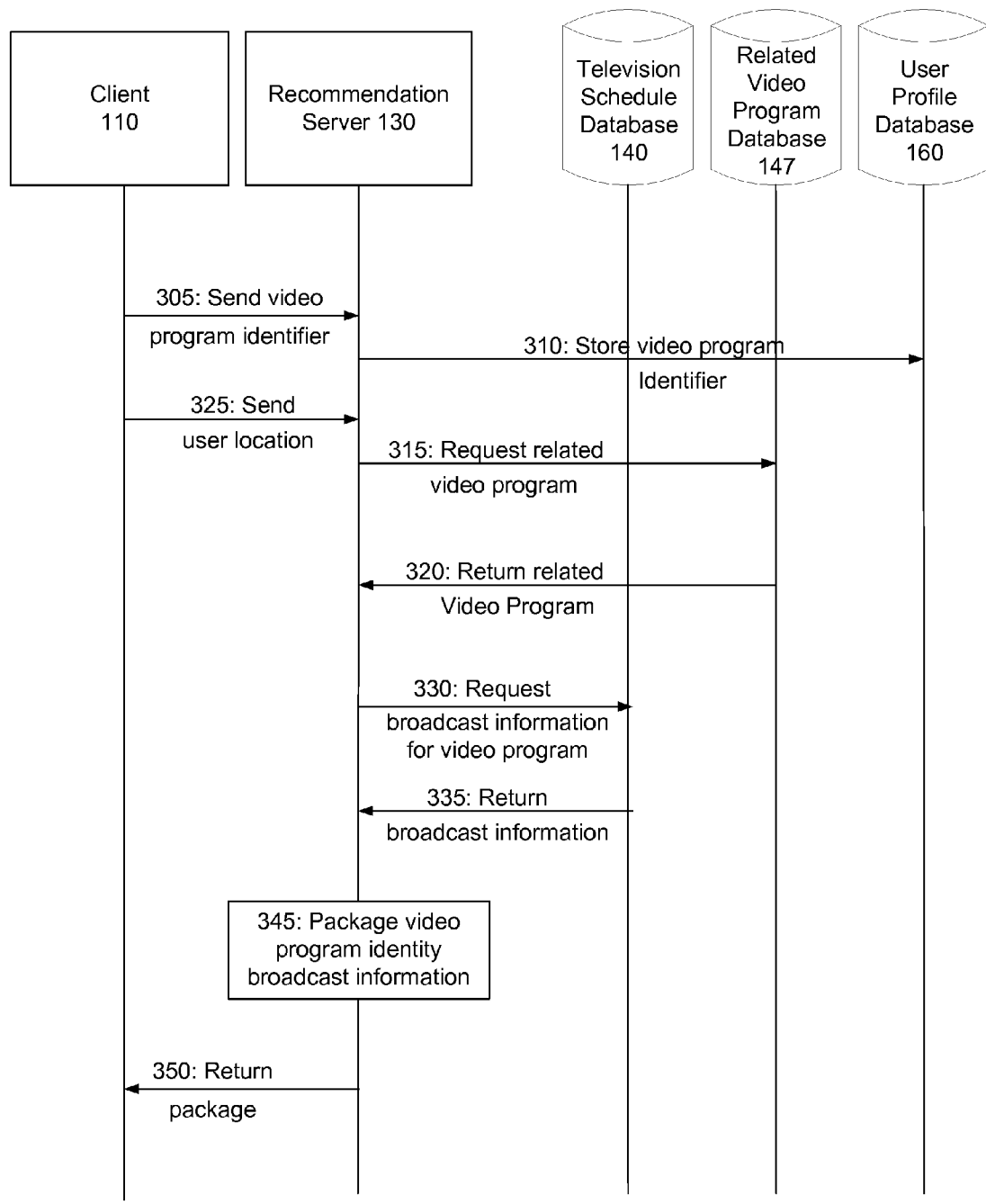
FIG. 3 is a data flow chart showing the method of recommending video programs to a user according to one embodiment.

FIG. 3 is a data flow chart showing a method of recommending video programs to a user according to one embodiment. The client 110 sends 305, on behalf of a user, an identifier of a video program to the recommendation server 130 via the front end server 125. The identifier can be of a video program that the user is currently being presented to the user, the user has just recorded, or has otherwise expressed an interest in. The video identifier can be manually input, or more preferably, determined by the client 110 automatically based on the available data pertaining to what the user is watching, has recently watched, has recently recorded, or has tuned to. The identifier of the video program serves as an indication of a video program that is of interest to the user. Alternatively, an indication of a video program of interest to a user is an audio fingerprint of a video program that the user is currently being presented to the user, the user has just recorded, or has otherwise expressed an interest in.

Additionally, the client 110 sends 325 the user identifier to the recommendation server 130. The recommendation server 130 receives the identifier, and stores 310 the identifier of the video program received from the client 110 in the user's profile in the user profile database 160.

The recommendation server 130 requests 315 video programs related to the video program identifier received from the client 110 in the related video program database 147. Related video programs are returned 320 by the related video program database 147. The associated video programs are ranked and if the number of associated video programs exceeds a threshold number, in one embodiment, the related video program database 147 only returns the threshold number.

For each related video program, the recommendation server 130 looks up 330 the broadcast date, channel and time for the related video program at the user's location and for the user's broadcast system in the television schedule database 140. As indicated above, the user's location can be inferred from the user's IP address, or obtained from stored profile information provided by the user. The television schedule database 140 returns 335 the broadcast date, channel and time to the recommendation server 130. The recommendation server discards any related video program that will not be available to view at the user's location on the user's broadcast system within a pre-determined amount of time. For example, video programs available to view within half an hour to three hours of when the recommendation will be made allows the viewer to see recommendations for the near future. Preferably, the recommendation server 130 provides a set of 3-5 recommended video programs that will be available for viewing and or recording.

Figure 4:
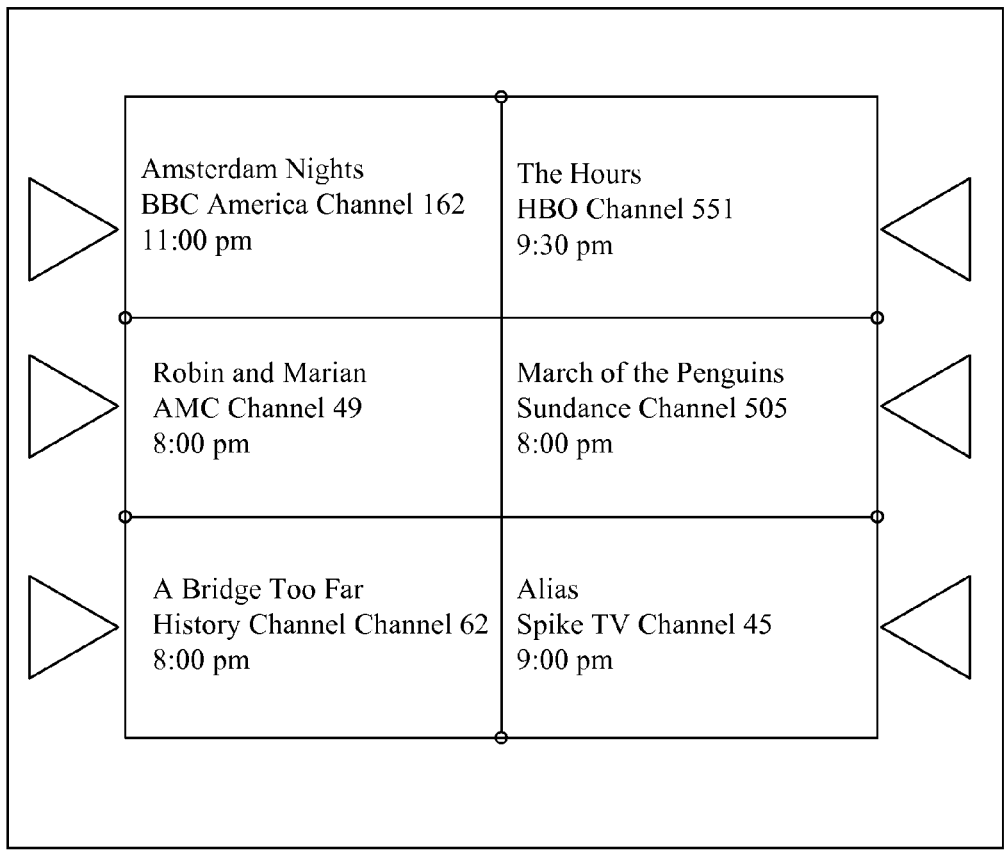
FIG. 4 is a sample display of recommendations presented to the user at the client.

The recommendation server 130 packages 345 the recommendations of the related video programs, and its broadcast date, channel and time. The recommendation server returns 350 the packaged information to the client 110 via front end server 125. The recommendations can be packaged in an XML file, an HTML page, or in any other encoding or formatted presentation format. The client 110 then displays the recommendations to the user. FIG. 4 illustrates a sample page containing recommendations for the user.

Alternatively, the recommendation server 130 provides the content of the video program to the client 110 in addition to or in place of recommendation for a video program. The video program can be streamed to the client 110 by the recommendation server 130 acting as streaming video server. In another embodiment, the video program is sent to the client 110 in a format that allows the video program to be downloaded and stored at the client 110 for viewing at a later time.

In an alternative embodiment, after receiving related video programs 320 from the related video program database 147, the recommendation server 130 requests from the user profile database 160 a list of the video programs and attributes upon which the user has previously searched and video programs the user has previously downloaded or streamed. The recommendation server 130 ranks the returned related video programs giving additional weight to video programs which have attributes upon which the user has searched or attributes in common with video programs upon which the user has searched, downloaded or streamed.

Alternatively or additionally, the recommendation server 130 receives a request for a recommendation from the client 110 but does not receive the identifier of a video program. The recommendation server 130 looks up video programs stored in the user's user profile and determines video programs related to those stored video programs to recommend to the user, and filtering those programs according to broadcast availability.

The log processing engine 135 and recommendation server 130 operate asynchronously. Because access logs of search engines and online video content providers and similar web services are constantly changing, co-occurrence frequencies between search queries related to video programs changes as well. Therefore the log processing engine updates the lists of associated video programs at predetermined intervals. For example, the lists could be updated daily or weekly.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method for recommending a video program to a user comprising:
    storing a database of video program information including information identifying related video programs, wherein the related video programs are determined based upon analysis of user interactions with an internet search engine or online video content provider;

receiving, from a first user device, an indication of a first video program;

identifying a plurality of video programs related to the first video program based on the information identifying related video programs and the received indication, wherein each of the plurality of video programs corresponds to at least one of a plurality of types of user interactions related to the first video program, wherein the plurality of types of user interactions are received from a plurality of user devices other than the first user device, and wherein each of the plurality of types of user interactions is associated with an assigned weight;

determining, for each combination of the first video program and one of the plurality of video programs, a frequency count that indicates a number of times each combination occurs in connection with each type of user interaction;

ranking the plurality of video programs based on the assigned weight being applied to the type of user interactions and the frequency counts;

determining a second video program related to the first video program from the plurality of video programs based on the ranking; and providing the user with a recommendation for the second video program;

wherein the plurality of types of user interactions comprise streaming of at least one video program.

2. The method of claim 1 further comprising storing an identifier of the first video program in a user profile of the user.

3. The method of claim 1 further comprising storing an identifier of the second video program in a user profile of the user.

4. The method of claim 1, wherein receiving an indication of the first video program comprises accessing a user profile to obtain an identifier of the video program.

5. The method of claim 1, wherein receiving an indication of the first video program comprises receiving information about a video program currently being presented to the user.

6. The method of claim 1, wherein receiving an indication of the first video program comprises receiving information about a video program from a client device of the user coupled to a network.

7. The method of claim 1, wherein providing the user with a recommendation for the second video program comprises providing the user with the content of the video program.

8. The method of claim 1, wherein:
receiving an indication of a first video program comprises receiving an indication of a first video program from a client coupled to a network; and
providing the user with a recommendation comprises providing a recommendation to the client coupled to the network.

9. The method of claim 1, wherein:
receiving an indication of a first video program comprises accessing a user profile of the user; and
providing the user with a recommendation comprises providing a recommendation to a client coupled to a network.

10. The method of claim 1, wherein:
receiving an indication of a first video program comprises receiving an indication of a first video program from a first client coupled to a network; and
providing the user with a recommendation comprises providing a recommendation to a second client coupled to the network.

11. The method of claim 1, further comprising selecting the second video program having a current broadcast time in the near future on the user's broadcast system.

12. The method of claim 11, wherein the user's broadcast system is determined from a user profile.

13. The method of claim 1, further comprising selecting the second video program having a current broadcast time in the near future in the user's location.

14. The method of claim 13, wherein the user's location is determined from a user profile.

15. The method of claim 13, wherein the user's location is determined from the user's IP address.

16. The method of claim 1, wherein the recommendation comprises a broadcast date, broadcast time, and broadcast channel on the user's broadcast system for the second video program.

17. The method of claim 1, wherein providing the user with a recommendation for the second video program comprises using information from a user profile to rank the recommendations.

18. The method of claim 17 wherein information from a user profile comprises search queries for video programs or attributes of video programs and wherein ranking the recommendations comprises giving extra weight to recommendations that have attributes in common with the search queries.

19. The method of claim 17 wherein information from a user a profile comprises titles of video programs that have been downloaded or streamed and wherein ranking the recommendations comprises giving extra weight to recommendations that have attributes in common with the downloaded or streamed video programs.

20. A computer implemented system, including a processor and memory, for recommending a video program to a user, comprising:
a database of video program information including information identifying related video programs, wherein the related video programs are determined based upon analysis of user interactions with an internet search engine or online video content provider;
a first module configured to receive, from a first user device, an indication of a first video program;
a second module configured to:
identify a plurality of video programs related to the first video program based on the information identifying related video programs and the received indication, wherein each of the plurality of video programs corresponds to at least one of a plurality of types of user interactions related to the first video program, wherein the plurality of types of user interactions are received from a plurality of user devices other than the first user device, and wherein each of the plurality of types of user interactions is associated with an assigned weight,
determine, for each combination of the first video program and one of the plurality of video programs, a frequency count that indicates a number of times each combination occurs in connection with each type of user interaction,
rank the plurality of video programs based on the assigned weight being applied to the type of user interactions and the frequency counts, and
determine a second video program related to the first video program from the plurality of video programs based on the ranking; and a third module communicatively coupled to the second module configured to provide to the user a recommendation for the second video program;

wherein the plurality of types of user interactions comprises streaming of at least one video program.

21. The system of claim 20 further comprising a second database configured to store user profiles.

22. The system of claim 20 wherein the first module is further configured to receive the indication of the first video program from a user profile of the user in the second database.

23. The system of claim 20 wherein the first module configured to receive an indication of a first video program comprises the first module configured to receive an indication of a first video program from a client device of the user coupled to a network.

24. The system of claim 20 wherein:

the first module configured to receive an indication of a first video program comprises the first module configured to receive an indication of a first video program from a client device of the user coupled to a network; and the third module configured to provide to the user a recommendation for the second video program comprises the third module configured to provide the recommendation to the client device of the user coupled to the network.

25. The system of claim 20 wherein:

the first module configured to receive an indication of a first video program comprises the first module configured to access a user profile of the user; and the third module configured to provide to the user a recommendation for the second video program comprises the third module configured to provide the recommendation to a client device of the user coupled to the network.

26. The system of claim 20 wherein:

the first module configured to receive an indication of a first video program comprises the first module configured to receive the indication of the first video program from a first client device of the user coupled to a network; and the third module configured to provide to the user a recommendation for the second video program comprises the third module configured to provide the recommendation to a second client device of the user coupled to the network.

27. A non-transitory computer readable medium having computer readable program code embodied therein to recommend a video program to a user, the computer readable program code in the non-transitory computer-readable medium including:

computer readable program code to store a database of video program information including information identifying related video programs, wherein the related video programs are determined based upon analysis of user interactions with an internet search engine or online video content provider;

computer readable program code to receive, from a first user device, an indication of a first video program;

computer readable program code to identify a plurality of video programs related to the first video program based on the information identifying related video programs and the received indication, wherein each of the plurality of video programs corresponds to at least one of a plurality of types of user interactions related to the first video program, wherein the plurality of types of user interactions are received from a plurality of user devices other than the first user device, and wherein each of the plurality of types of user interactions is associated with an assigned weight;

computer readable program code to determine, for each combination of the first video program and one of the plurality of video programs, a frequency count that indicates a number of times each combination occurs in connection with each type of user interaction;

computer readable program code to rank the plurality of video programs based on the assigned weight being applied to the type of user interactions and the frequency counts;

computer readable program code to determine a second video program related to the first video program from the plurality of video programs based on the ranking; and computer readable program code to provide the user with a recommendation for the second video program;

wherein the interaction of the user comprises the streaming of at least one video program.

* * * * *